Aug. 22, 1933.   E. J. BACH   1,923,069
CORING MACHINE
Filed Aug. 6, 1931   2 Sheets-Sheet 1

Edward J. Bach
INVENTOR.
BY Benjamin Webster
ATTORNEY

Aug. 22, 1933.  E. J. BACH  1,923,069
CORING MACHINE
Filed Aug. 6, 1931    2 Sheets-Sheet 2

Edward J. Bach
INVENTOR.
BY Benjamin Webster
ATTORNEY

Patented Aug. 22, 1933

1,923,069

UNITED STATES PATENT OFFICE 1,923,069

CORING MACHINE

Edward J. Bach, East Orange, N. J., assignor of one-half to Mont D. Rogers, Pelham Manor, N. Y.

Application August 6, 1931. Serial No. 555,419

7 Claims. (Cl. 146—1)

This invention relates to coring devices, and more particularly to machines for coring. Coring machinery has been used for coring apples, etc., but never heretofore for coring rolls, cakes, etc., in order to provide recesses for meats, fruits, ice cream, etc.

The objects of the invention are, among others: first, to provide a device adapted to make a recess or core in bread, rolls, cake, etc.; second, to provide such a device that can core large quantities of pieces in a short time and economically; third, to provide such a device that is always effective without care or adjustment in coring baked dough of varying constituency and consistency; fourth, to provide such a device in which the core is positively and automatically ejected; fifth, to provide a complete portable unit adapted for transportation to shops and stands; sixth, to provide improved means for securing and moving the rolls into and out of coring position; and seventh, to provide a serviceable, easily operated device of durable construction, easily assembled and disassembled. Other objects will appear as the specification proceeds.

Figure 1:
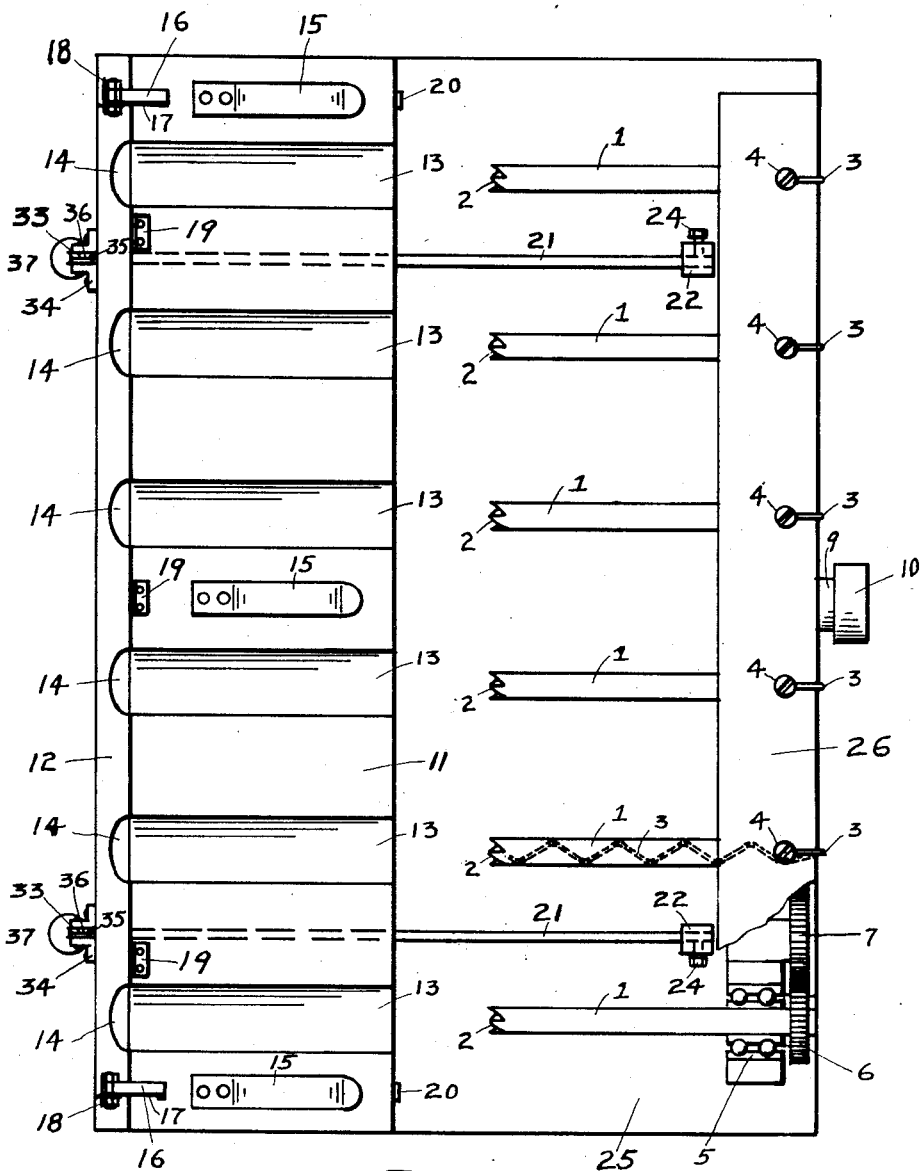
Figure 2:
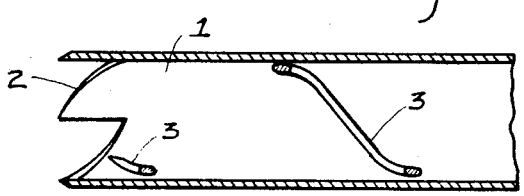
Figure 4:
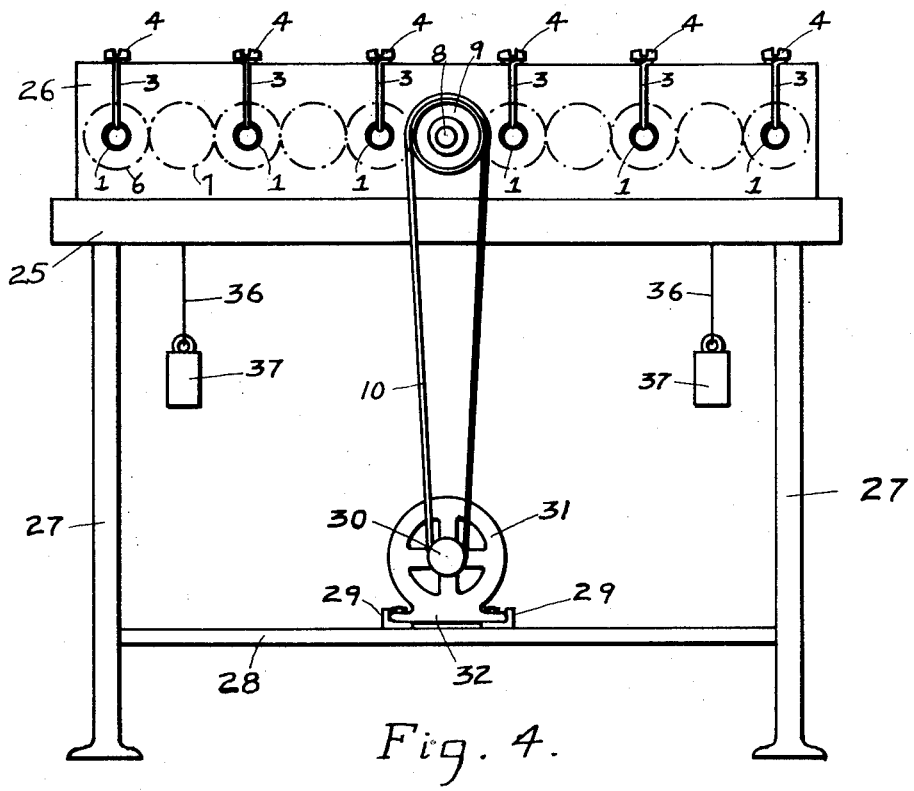
Figure 3:
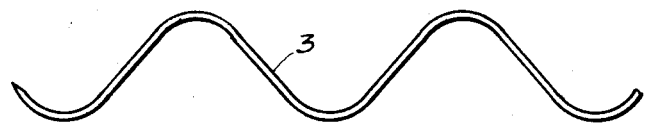
Figure 5:
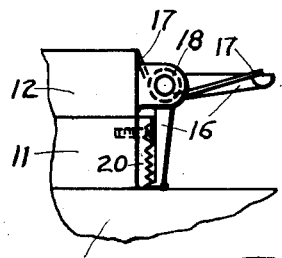

Reference is made to the drawings for an illustration of one embodiment of the invention in which Fig. 1 is a plan view with a part of the housing broken away in the lower right hand corner, Fig. 2 is a longitudinal section through one of the coring pieces, Fig. 3 shows the sharp-ended steel spiral that lies within each coring piece, Fig. 4 is a right end elevation, and Fig. 5 is a lower end view showing the lock for the carrier.

Similar numerals of reference refer to like parts throughout the drawings. The hollow cylindrical tubes or coring pieces 1 are formed of steel and each end is provided with four recesses one edge of which is parallel with the axis of the tube and the other inclined from the top of the recess to the bottom. This construction provides four piercing points and four cutting edges 2 which are beveled and finished like cutting knives. The inside of each coring piece 1 is a true cylinder. A spiral steel coil, sharpened at the end, and with the spiral traveling in the direction of rotation of piece 1 is so secured by a setscrew 4 on the casing 26 in each tube 1 that the cylinder defining the outside of the spiral is concentric with but slightly removed from the cylindrical inner wall of the tube. The set-screw 4 provides an easy adjustment of the spiral 3 or its replacement.

Each piece 1 has a ball-bearing mounting and a gear 6 fixed thereon at the rear. As shown a gear 7 connects the adjacent gears 6. However the tubes 1 may be rotated by direct gear connection one to the other in which construction care must be taken in assembling the machine to have all cutting edges 2 travel in the direction of rotation of each tube, necessitating two kinds of tube, one with right hand cutting edges 2 and one with left hand cutting edges 2, and two kinds of spirals 3 must be used as the spiral must travel in the direction of rotation of the tube. The operation of the machine is the same in either case. The actuating shaft 8 also carries a gear which in turn actuates meshing gears on either side and so the whole group. Any number of tubes 1 with their ballbearing mountings and gears 6 may be added as desired.

To shaft 8 is secured a pulley 9 over which travels the belt 10. As shown the direction of rotation of the pulley 9 is clockwise.

The roll carrier 11 has on its upper surface roll-recesses 13 open at the ends toward the tubes 1 and a top 12 adapted to turn down over the carrier 11 and having recesses 14 therein similar to the recesses 13 on the top surface of the carrier 11. Corresponding recesses 13 and 14 together form holders for the rolls. On the top of the carrier 11 are secured upwardly curved springs 15 which engage the lower surface of 12 as it is turned down. When engaged they tend to raise the top section 12. Secured on the edge of the top 12 at each end is a crank lever 16 having a coil spring 17 mounted on the bracket 18 and tending to push the toothed end of crank 16 into engagement with the rack 20 mounted on the edge of the carrier 11. Butts or hinges 19 secure the carrier 11 and the top 12 at the rear. Two rails 21 provide a track for sliding the carrier toward and away from the tubes 1. Stops 22 are adjustably secured on the rails 21 by means of the thumb screws 24. The table top 25 may be of any desired size. The gears 6 and the ball bearings 5 are encased in a dust-proof housing 26. Legs 27 of any desired height are connected by cross pieces 28 which support L-beams 29 on which is supported the electrical motor 31 having a driving shaft 30 for actuating the belt 10. On the left end of the table 25 pulleys 33 are supported in brackets 34. Hooks 35 are secured to the left edge of the carrier 11. Wires 36 to which are secured weights 37 run over the pulleys 33 and automatically return the carrier 11 to the position shown after the coring operation.

The operation of the machine is as follows: The motor 31 is connected with an electrical socket and the switch is turned. A roll is placed in each recess 13. The top 12 is turned down on the springs 15. The forefinger of each hand is placed under the cranks 16 while the palms of the hand press the top 12 into contact with the rolls whereupon the fingers are released and the hooks on the cranks 16 interlock with teeth on the rack 20. The carrier 11 is then pushed along the rails 21 to the stops 22. During the movement the cutting tubes 1 core the rolls and eject the cores to the right of the housing 26. Upon releasing it the carrier 11 slides back to the position shown in Fig. 1. The forefinger of each hand lifts up the crank 16 to unlock the top 12 which is partly raised by the springs 15 and turned back to expose the cored rolls, which are then removed and the carrier again loaded.

I have shown and described one embodiment of my invention and have contemplated many modifications which may readily occur to those skilled in the art in the light of my specification and within the scope of my invention, so therefore I do not choose to limit myself except as in the appended claims.

I claim:

1. In a coring device for rolls and the like, the combination with a rotatable hollow borer and a stationary spiral wire extending along the interior of said borer and having its spiral convolutions extending throughout the length of the borer and having its fixed end extending through the open end of the borer for removing the core of the roll released by the borer.

2. In an apparatus for coring bread and the like, comprising a rotatable hollow cylinder for boring said bread and having sharp edged serrations at one end, a spiral wire with a sharpened end aligned with the serrations for removing the core from the bread, and means for holding the spiral wire stationary during the rotation of the borer whereby the core of the bread is ejected from the opposite end of the borer.

3. In an apparatus for coring bread and the like, having a stand, rails disposed horizontally on the stand, a carrier table movable on said rails and having means for normally drawing the table toward one edge of the stand, said table having a plurality of recesses therein for accommodating the bread, hingedly movable means on the table for retaining the bread in said recesses; the improvement comprising rotatable coring means on the opposite edge of the stand for coring the bread in the recesses when the table is slid on the rails towards said coring means, a stationary spiral within the coring means having a sharpened free end adjacent the cutting end of the coring means for engaging the bread core and extending throughout the length of the boring means and out of the same at the other end thereof, and means for driving said coring means, the bread in said recesses being longitudinally cored and having one free open end therein.

4. In a coring machine for bread rolls and the like, the combination with a slidable carrier table for supporting the rolls of a plurality of rotatable hollow boring members spaced apart from each other, having sharp serrated edges at one end for cutting into said rolls to remove the core, and a stationary spiral guide wire within each boring member, said wire having a sharp end adjacent the cutting edges of the boring members while the opposite free end is fixed to the body of the machine, whereby upon moving the table toward the boring members, the removed cores of the rolls are guided by said wire in the members outwardly through the other end of the boring members.

5. Coring apparatus for bread rolls and the like, comprising a table top, rails on said table, a reciprocable carrier slidable on the rails and having recesses therein for bread rolls, a plurality of hollow cylindrical boring elements mounted on said table having sharp cutting edges at one end facing the carrier and in alignment with the rolls when set in the recesses, resilient guide means within the boring members fixed onto the table for removing the core of the rolls from the boring members during their boring action, and means for rotating said boring members.

6. In apparatus for coring bread rolls and the like, the improvement comprising a table, a hollow cylindrical boring member having sharp serrations at one end thereof, a stationary helical spring with one end fixed onto the table and extending into the boring member, said spring having a sharpened free end inside the boring member whereby to engage the core of the roll during its coring and to guide the core outwardly of the member during the rotation of the same, and means for operatively rotating said boring member.

7. In apparatus for coring bread rolls and the like, a table having a pair of rails thereon, a carrier slidable on said rails having juxtaposed recesses for holding bread rolls therein, means extending across the top of the carrier for holding the bread rolls in position therein, hollow rotatable cylinders mounted on the table and in alignment with the recesses for coring the bread rolls, and fixed helical guide means inside the coring cylinders whereby, upon moving the roll carrier toward the coring cylinders, the removed cores of the bread rolls are guided out of the cylinders during their rotation.

EDWARD J. BACH.